(12) United States Patent
Miyamoto et al.

(10) Patent No.: US 10,906,280 B2
(45) Date of Patent: *Feb. 2, 2021

(54) DECORATIVE SHEET

(71) Applicant: TOPPAN PRINTING CO., LTD., Tokyo (JP)

(72) Inventors: Shinichi Miyamoto, Tokyo (JP); Masashi Hattori, Tokyo (JP); Masamitsu Nagahama, Chiba (JP); Akira Sato, Chiba (JP); Masatoshi Takahashi, Chiba (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 35 days.

This patent is subject to a terminal disclaimer.

(21) Appl. No.: 15/754,272

(22) PCT Filed: Aug. 24, 2016

(86) PCT No.: PCT/JP2016/074668
§ 371 (c)(1),
(2) Date: Feb. 21, 2018

(87) PCT Pub. No.: WO2017/033972
PCT Pub. Date: Mar. 2, 2017

(65) Prior Publication Data
US 2018/0264791 A1    Sep. 20, 2018

(30) Foreign Application Priority Data
Aug. 24, 2015  (JP) ................. 2015-164382

(51) Int. Cl.
*B32B 27/32*  (2006.01)
*C08J 5/18*  (2006.01)
(Continued)

(52) U.S. Cl.
CPC ............. *B32B 27/32* (2013.01); *B32B 3/30* (2013.01); *B32B 27/08* (2013.01); *B32B 27/18* (2013.01);
(Continued)

(58) Field of Classification Search
CPC ........ B32B 27/32; C08K 5/0083; C08K 9/10; C08L 23/12; C09D 123/12; C08J 2323/12
See application file for complete search history.

(56) References Cited

U.S. PATENT DOCUMENTS

| | | | |
|---|---|---|---|
| 5,596,426 A | 1/1997 | Ueno et al. | |
| 2010/0009135 A1* | 1/2010 | Hama | B44F 9/02 428/195.1 |

(Continued)

FOREIGN PATENT DOCUMENTS

| | | |
|---|---|---|
| CN | 101688005 A | 3/2010 |
| CN | 107073913 A | 8/2017 |

(Continued)

OTHER PUBLICATIONS

Partial machine translation of JP 2001-181411 A (2019).*

(Continued)

*Primary Examiner* — Kregg T Brooks
(74) *Attorney, Agent, or Firm* — Squire Patton Boggs (US) LLP

(57) ABSTRACT

To provide a decorative sheet including a transparent resin layer having excellent post-processing resistance and high transparency. A decorative sheet (1) according to one aspect of the present invention has a transparent resin layer (4) containing a crystalline polypropylene resin as the main component. A value of a peak intensity ratio x represented by the following expression (1) of the transparent resin layer (4) is x≤0.65. Herein, I997, I938, and I973 in the following (Continued)

expression (1) are peak intensity values calculated from the absorption spectrum obtained by Fourier infrared spectrometry of the transparent resin layer, and I997 is the peak intensity value at a wavenumber of 997 cm$^{-1}$, I938 is the peak intensity value at a wavenumber of 938 cm$^{-1}$, and I973 is the peak intensity value at a wavenumber of 973 cm$^{-1}$.

$$\text{Peak intensity ratio } x = \frac{1997 - 1938}{1973 - 1938} \quad (1)$$

1 Claim, 1 Drawing Sheet

(51) Int. Cl.
| | | |
|---|---|---|
| *C08K 5/527* | (2006.01) | |
| *B32B 27/18* | (2006.01) | |
| *C08K 9/10* | (2006.01) | |
| *C08J 5/10* | (2006.01) | |
| *B32B 3/30* | (2006.01) | |
| *B32B 27/08* | (2006.01) | |
| *C08K 5/00* | (2006.01) | |

(52) U.S. Cl.
CPC . *C08J 5/10* (2013.01); *C08J 5/18* (2013.01); *C08K 5/0083* (2013.01); *C08K 5/527* (2013.01); *C08K 9/10* (2013.01); *B32B 2250/05* (2013.01); *B32B 2307/412* (2013.01); *B32B 2451/00* (2013.01); *C08J 2323/12* (2013.01); *C08K 2201/011* (2013.01); *C08L 2205/24* (2013.01)

(56) References Cited

U.S. PATENT DOCUMENTS

| | | |
|---|---|---|
| 2011/0014408 A1 | 1/2011 | Fujiwara et al. |
| 2016/0009880 A1* | 1/2016 | Abe .................. B29C 48/08 428/220 |
| 2018/0186132 A1 | 7/2018 | Ikeda et al. |
| 2018/0244877 A1 | 8/2018 | Miyamoto et al. |
| 2018/0264791 A1 | 9/2018 | Miyamoto et al. |

FOREIGN PATENT DOCUMENTS

| | | |
|---|---|---|
| EP | 0 255 693 A2 | 2/1988 |
| EP | 2 075 127 | 7/2009 |
| EP | 3 219 488 A1 | 9/2017 |
| EP | 3 342 588 A1 | 7/2018 |
| JP | H02-128843 A | 5/1990 |
| JP | H04-83664 A | 3/1992 |
| JP | H06-001881 A | 1/1994 |
| JP | H06-198831 A | 7/1994 |
| JP | H09-328562 A | 12/1997 |
| JP | H10-58596 A | 3/1998 |
| JP | H11-179800 A | 7/1999 |
| JP | 2001-114946 A | 4/2001 |
| JP | 2001-162744 A | 6/2001 |
| JP | 2001181411 A * | 7/2001 |
| JP | 3271022 B2 | 4/2002 |
| JP | 2003-039613 A | 2/2003 |
| JP | 3772634 B | 2/2006 |
| JP | 2007-077345 A | 3/2007 |
| JP | 2007-100045 A | 4/2007 |
| JP | 2008-296962 A | 12/2008 |
| JP | 2009-013357 A | 1/2009 |
| JP | 2009-107143 A | 5/2009 |
| JP | 2010-069710 A | 4/2010 |
| JP | 2011-127013 A | 6/2011 |
| JP | 2013-122020 A | 6/2013 |
| JP | 2017-042916 A | 3/2017 |
| JP | 2017-042917 A | 3/2017 |
| WO | WO 2004/087795 A1 | 10/2004 |
| WO | WO 2008/041649 A1 | 4/2008 |
| WO | WO 2016/076360 A1 | 5/2016 |

OTHER PUBLICATIONS

Luongo, "Infrared Study of Polypropylene," J. Appl. Polym. Sci. 3, 302-309 (1960).*
Extended European Search Report dated Apr. 1, 2019 issued for European Patent Application No. 16839319.7, 8 pages.
International Search Report for PCT/JP2016/074668, dated Nov. 8, 2016.
Extended European Search Report dated Jan. 31, 2019 issued for European Patent Application No. 16839318.9, 6 pages.
International Search Report for International PCT application No. PCT/JP2016/074667, dated Nov. 8, 2016.
Non-Final Office Action for U.S. Appl. No. 15/754,250, 12 pages, dated Nov. 29, 2019.
Final Office Action for U.S. Appl. No. 15/754,250, 6 pages, dated Jun. 1, 2020.

* cited by examiner

DECORATIVE SHEET

TECHNICAL FIELD

The present invention relates to a decorative sheet.

BACKGROUND ART

As technologies relating to a decorative sheet containing an olefin-based resin drawing attention as a decorative sheet substituting a polyvinyl chloride decorative sheet, the technologies described in PTLs 1 to 6 are mentioned, for example.

However, these decorative sheets have had a problem of hardly including a transparent resin layer having excellent post-processing resistance and high transparency.

CITATION LIST

Patent Literatures

PTL 1: JP 2-128843 A
PTL 2: JP 4-083664 A
PTL 3: JP 6-001881 A
PTL 4: JP 6-198831 A
PTL 5: JP 9-328562 A
PTL 6: JP 3772634

SUMMARY OF INVENTION

Technical Problem

The present invention aims at solving such problems. It is an object of the present invention to provide a decorative sheet including a transparent resin layer having excellent post-processing resistance and high transparency.

Solution to Problem

In order to achieve the object, a decorative sheet according to one aspect of the present invention includes a transparent resin layer containing a crystalline polypropylene resin as the main component, and a value of a peak intensity ratio x represented by the following expression (1) of the transparent resin layer is x≤0.65. Herein, I997, I938, and I973 in the following expression (1) are peak intensity values calculated from the absorption spectrum obtained by the Fourier infrared spectrometry of the transparent resin layer, I997 represents the peak intensity value at a wavenumber of 997 cm$^{-1}$, I938 represents the peak intensity value at a wavenumber of 938 cm$^{-1}$, and I973 represents the peak intensity value at a wavenumber of 973 cm$^{-1}$.

[Expression 1]

$$\text{Peak intensity ratio } x = \frac{I997 - I938}{I973 - I938} \qquad (1)$$

Advantageous Effects of Invention

One aspect of the present invention can provide a decorative sheet including a transparent resin layer having excellent post-processing resistance and high transparency.

DESCRIPTION OF EMBODIMENTS

Figure 1:
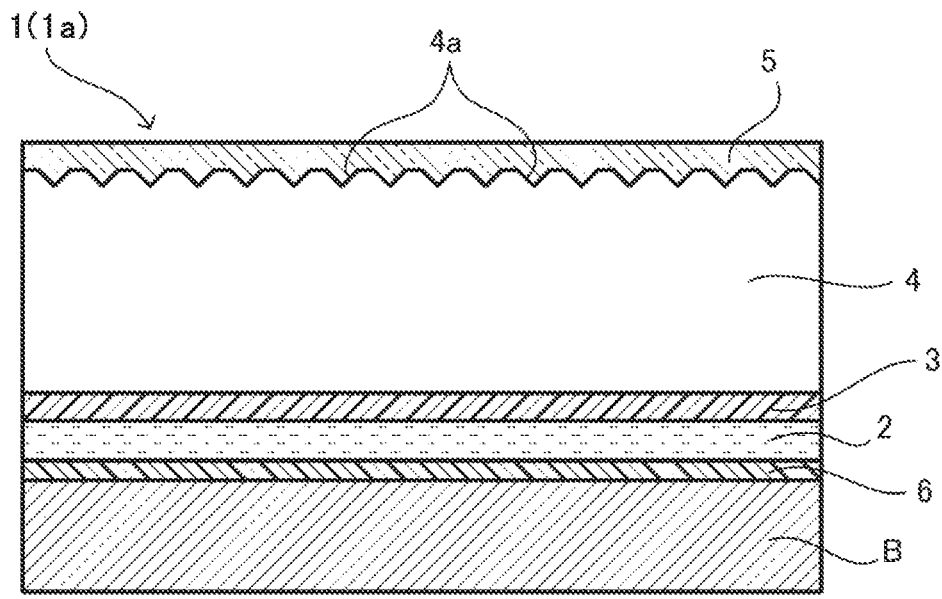
FIG. 1 is a schematic cross sectional view illustrating the configuration of a decorative sheet according to a first embodiment of the present invention.

A decorative sheet according to each embodiment of the present invention includes a transparent resin layer (also referred to as "transparent resin sheet") containing a crystalline polypropylene resin as the main component, and a value of a peak intensity ratio x represented by the following expression (2) of the transparent resin layer is x≤0.65. Herein, I997, I938, and I973 in the following expression (2) are peak intensity values calculated from the absorption spectrum obtained by the Fourier infrared spectrometry of the transparent resin layer, I997 represents the peak intensity value at a wavenumber of 997 cm$^{-1}$, I938 represents the peak intensity value at a wavenumber of 938 cm$^{-1}$, and I973 represents the peak intensity value at a wavenumber of 973 cm$^{-1}$.

The "containing a crystalline polypropylene resin as the main component" refers to the fact that the crystalline polypropylene resin occupies 80% by mass or more and 100% by mass or less and preferably 90% by mass or more and 100% by mass or less of a resin configuring the transparent resin layer, for example.

[Expression 2]

$$\text{Peak intensity ratio } x = \frac{I997 - I938}{I973 - I938} \qquad (2)$$

The peak intensity ratio x of the transparent resin sheet is particularly preferably 0.55≤x≤0.65. By setting the peak intensity ratio x within the range mentioned above, the decorative sheet including the transparent resin layer extremely excellent in post-processing resistance can be provided.

In the decorative sheet according to each embodiment of the present invention, the peak intensity ratio x of the transparent resin layer is set within the range mentioned above by controlling the film formation conditions as a process factor. In this case, the transparent resin sheet is preferably formed to have a thickness of 20 μm or more and 200 μm or less. This is because, when the thickness of the transparent resin sheet is smaller than the thickness within the range mentioned above, the scratch resistance is difficult to secure and, when the thickness of the transparent resin sheet is larger than the thickness within the range mentioned above, cooling in the thickness direction of the resin sheet is not uniformly performed, and, as a result, the resin cannot be uniformly hardened. The thickness of the transparent resin layer is more preferably formed to have a thickness of 30 μm or more and 150 μm or less.

[Control of Peak Intensity Ratio x]

As the film formation conditions for setting the peak intensity ratio x within the ranges mentioned above, any condition may be acceptable insofar as the degree of crystallization of the polypropylene resin can be adjusted. In each embodiment of the present invention, the degree of crystallization is adjusted by adjusting the resin temperature, the cooling temperature, the cooling time, and the like. By controlling one or two or more of these conditions, the peak intensity ratio x can be adjusted within the ranges mentioned above.

More specifically, the resin temperature is the temperature when a resin melted in the film formation is discharged. With an increase in the resin temperature (increasing the temperature to a higher temperature), the peak intensity ratio x becomes larger. The cooling temperature is a temperature cooling the discharged resin. With an increase in the cooling temperature (increasing the temperature to a higher temperature), the peak intensity ratio x becomes larger. With respect to the cooling time, by lengthening the passage time around the crystallization temperature (100 to 130° C.) of the polypropylene resin, the peak intensity ratio x becomes larger. By combining the above-described conditions to thereby control the crystallization and the crystal size in the resin, the peak intensity ratio x can be appropriately adjusted.

[Fourier Infrared Spectrometry]

Hereinafter, the Fourier infrared spectrometry is described.

First, the infrared spectrometry is a measurement method for obtaining information on the chemical structure and state of a substance by measuring an infrared light absorbed into the substance utilizing the principle that the amount of an infrared light of a wavelength of 0.7 µm to 1000 µm absorbed into the substance varies based on vibration or rotational mode of the molecules of the substance.

In particular, the wavelength range referred to as a mid infrared ray having a wavelength of 2.5 to 4 µm in which the spectrum peculiar to a substance appears is mainly used.

As a specific measurement method for the Fourier infrared spectrometry, light (infrared light) emitted from a light source is caused to obliquely enter an interferometer through a beam splitter to be split into a transmitted light and a reflected light. The transmitted light and the reflected light are reflected with a fixed mirror and a moving mirror to return to the beam splitter to be synthesized again to be an interference wave. An optical path difference varies depending on the position where the moving mirror moves, and therefore different interference waves are obtained.

By emitting the different interference waves to a sample, and then calculating the intensity of light of each wavenumber component from the signal intensity of the transmitted light or the reflected light from the sample, the infrared spectrum is measured. In particular, in this embodiment of the present invention, the calculation of the interference wave was performed using a Fourier transformation method and the measurement was performed by the Fourier infrared spectrometry which is a method measuring the infrared spectrum. A graph in which the wavenumber obtained by the above-described method is plotted on the horizontal axis and the measured absorbance (or transmittance) is plotted on the vertical axis is referred to as an infrared absorption spectrum (or infrared transmission spectrum) and a pattern peculiar to each sample is observed. In this case, with respect to the absorbance of the vertical axis, the peak intensity value at a predetermined wavenumber varies in proportion to the concentration or the thickness of the sample and the amount of a crystalline portion or an amorphous portion in the case of a crystalline resin, and therefore quantitative analysis can also be performed from the height and the area of the peak.

In each embodiment of the present invention, utilizing the above-described characteristics of the infrared absorption spectrum, the ratio of the peak intensity at a wavenumber of 997 $cm^{-1}$ corresponding to the absorbance of a crystalline portion of the polypropylene transparent resin sheet to the peak intensity at a wavenumber of 973 $cm^{-1}$ corresponding to the absorbance of an amorphous portion of the transparent resin sheet, i.e., the peak intensity ratio x showing the degree of crystallization of polypropylene, in the absorption spectrum obtained by the above-described measurement is calculated based on Expression (2) above. By clarifying the relationship between the calculated peak intensity ratio x and the scratch resistance of the transparent resin sheet and using the transparent resin layer corresponding to the transparent resin sheet having the peak intensity ratio x within the ranges mentioned above, the decorative sheet excellent in scratch resistance is provided. The peak intensity at a wavenumber of 997 $cm^{-1}$ and the peak intensity at a wavenumber of 973 $cm^{-1}$ each are subjected to background correction using the peak intensity at a wavenumber of 938 $cm^{-1}$.

[Nucleating Agent]

It is preferable in the decorative sheet of each embodiment of the present invention that a nano-sized nucleating agent is added to the transparent resin sheet as the transparent resin layer. In particular, it is preferable that the nano-sized nucleating agent is a nucleating agent vesicle in which the nucleating agent is encapsulated in a vesicle having a monolayer outer membrane. By adding the nucleating agent vesicle to the polypropylene resin to thereby increase the degree of crystallization of the polypropylene resin, a transparent resin sheet having extremely high transparency can be obtained.

[Method for Producing Nucleating Agent Vesicle]

The above-described nucleating agent vesicle can be produced by a supercritical reverse phase evaporation method. The supercritical reverse phase evaporation method is a method for producing a nano-sized vesicle (capsule) encapsulating a target substance using carbon dioxide in a supercritical state or under the temperature conditions equal to or higher than the critical point or under the pressure conditions equal to or higher than the critical point. The carbon dioxide in the supercritical state means carbon dioxide in the supercritical state equal to or higher than the critical temperature (30.98° C.) and the critical pressure (7.3773±0.0030 MPa). The carbon dioxide under the temperature conditions equal to or higher than the critical point or under the pressure conditions equal to or higher than the critical point means carbon dioxide under the conditions where only the critical temperature or only the critical pressure exceeds the critical conditions.

Specifically, an aqueous phase is injected into a mixed fluid containing the carbon dioxide in the supercritical state, phospholipid, and a nucleating agent as an encapsulated substance, and then stirred, whereby an emulsion containing the carbon dioxide in the supercritical state and the aqueous phase is generated. Thereafter, when the pressure is reduced, the carbon dioxide expands and evaporates to cause phase transition, and then a nanovesicle in which the phospholipid covers the surface of nucleating agent nanoparticles with a monolayer membrane is generated. According to the supercritical reverse phase evaporation method, a vesicle with a single layer membrane can be generated, and therefore a vesicle of an extremely small size can be obtained.

The average particle diameter of the nucleating agent vesicle encapsulating the nano-sized nucleating agent is preferably ½ or less of a visible light wavelength (400 nm to 750 nm) and more specifically 200 nm to 375 nm or less. The nucleating agent vesicle is present in a state where the outer membrane of the vesicle is broken and the nano-sized nucleating agent is exposed in a resin composition. By setting the particle diameter of the nucleating agent to the minimum size within the ranges mentioned above to thereby suppress the scattering of light, a transparent resin layer having high transparency can be realized.

The nucleating agent is not particularly limited insofar as it is a substance serving as the starting point of crystallization when a resin is crystallized. For example, a phosphoric acid ester metal salt, a benzoic acid metal salt, a pimelic acid metal salt, a rosin metal salt, benzylidene sorbitol, quinacridone, cyanine blue, talc, and the like are mentioned. In particular, it is preferable to use a phosphoric acid ester metal salt, a benzoic acid metal salt, a pimelic acid metal salt, and a rosin metal salt which can be expected to have transparency in this embodiment.

Examples of the phospholipid include glycerophospholipids, such as phosphatidylcholine, phosphatidiethanolamine, phosphatidylserine, phosphatidic acid, phosphatidyl glycerol, phosphatidyl inositol, cardiopine, egg yolk lecithin, hydrogenated egg yolk lecithin, soy lecithin, and hydrogenated soy lecithin, and sphingophospholipids, such as sphingomyelin, ceramide phosphorylethanolamine, and ceramide phosphorylglycerol.

[Crystalline Polypropylene Resin]

The above-described crystalline polypropylene resin is not particularly limited. It is preferable to use a high crystalline homopolypropylene resin which is a homopolymer of propylene containing 95% or more and more preferably 96% or more of a pentad fraction (mmmm fraction).

The pentad fraction (mmmm fraction) is calculated from a numerical value (electromagnetic wave absorption rate) obtained by resonating a resin composition configuring the transparent resin layer at a predetermined resonant frequency by a $^{13}$C-NMR measurement method (nuclear magnetic resonance measurement method) using a carbon C (nuclide) having a mass number of 13 and prescribes the atomic arrangement, the electronic structure, and the fine structure of molecules in the resin composition. The pentad fraction of the polypropylene resin is a ratio in which five propylene units are arranged determined by the $^{13}$C-NMR and is used as the scale of the degree of crystallization or the stereoregularity. Such a pentad fraction is one of the important factors mainly determining the surface scratch resistance. Basically, when the pentad fraction is higher, the degree of crystallization of a sheet becomes higher, and therefore the scratch resistance is improved.

<Configuration of Decorative Sheet>

Hereinafter, specific examples of the configurations of the decorative sheets of the first embodiment and the second embodiment are described with reference to FIG. 1 and FIG. 2.

Herein, the drawings are schematic and the relationship between the thickness and the plane dimension, the ratio of the thickness of each layer, and the like are different from the actual relationship, ratio, and the like. In addition, in order to simplify the drawings, well-known structures are illustrated by the sketch. In each figure, constituent components demonstrating the same or similar functions are designated by the same referential signs and duplicated descriptions are omitted. Each embodiment described below describes the configuration for crystallizing the technical idea of the present invention as an example and the materials, shapes, structures, and the like of constituent parts in the technical idea of the present invention are not specified by the following materials, shapes, structures, and the like. The technical idea of the present invention can be variously altered within the technical scope specified by claims described in Claims.

First Embodiment

<Entire Configuration>

FIG. 1 illustrates the configuration of a decorative sheet 1(1a) according to the first embodiment of the present invention. The decorative sheet 1a is formed by successively laminating a primer layer 6, a concealing layer 2, a pattern printed layer 3, a transparent resin layer 4, and a topcoat layer 5 from a substrate B side to which the decorative sheet 1a is stuck. Examples of the substrate B include wooden boards, inorganic boards, metal plates, and the like, for example.

[Primer Layer 6]

Materials of the primer layer 6 can be selected as appropriate from nitrocotton, cellulose, a vinyl chloride-vinyl acetate copolymer, polyvinyl butyral, polyurethane, acrylic, and polyester type, and the like alone or modified products thereof as a binder to be used. These may be any of aqueous, solvent, and emulsion type. A curing method can also be selected as appropriate from a one-part type which is cured alone, a two-part type using a curing agent together with a main agent, a type which is cured by irradiation with ultraviolet rays, electron beams, and the like to be used. As a general curing method, a two-part type which is cured by using an isocyanate-based curing agent in combination with a urethane-based main agent is used. This method is suitable from the viewpoint of workability, cost, and aggregation force of a resin itself. In addition to the binders mentioned above, colorants, such as pigments or dyes, extenders, solvents, various additives, and the like are added, for example. In particular, the primer layer 6 is located on the rearmost surface of the decorative sheet 1a. Therefore, when considering winding the decorative sheet 1a as a continuous plastic film (web shape), it is required to avoid the occurrence of blocking, such as difficulty of sliding or non-peeling, due to sticking of films and it is required to increase the adhesion with an adhesive. Therefore, inorganic fillers, such as silica, alumina, magnesia, titanium oxide, and barium sulfate, for example, may be added to the primer layer 6. The layer thickness of the primer layer 6 is preferably set within the range of 0.1 μm to 3.0 μm because it is an object to secure the adhesiveness with the substrate B.

[Concealing Layer 2]

As materials of the concealing layer 2, materials for use in the primer layer 6 are basically usable. However, when the concealing properties are regarded as important, titanium oxide, iron oxide, and the like which are opaque pigments, for example, are preferably used as a pigment. In order to further increase the concealing properties, it is also suitable to add metals, such as gold, silver, copper, and aluminum, for example. In general, aluminum of a flake shape is added in many cases. The concealing layer 2 can be formed using the materials mentioned above by a comma coater, a knife coater, a lip coater, metal vapor deposition, or a sputtering method. When the layer thickness of the concealing layer 2 is less than 2 μm, the concealing properties are insufficient. When the layer thickness exceeds 10 μm, the aggregation force of a resin material as the main component decreases. Therefore, it is appropriate to set the thickness to 2 μm to 10 μm.

[Pattern Printed Layer 3]

Also as materials of the pattern printed layer 3, the same materials as those of the primer layer 6 are usable. Examples of pigments having high versatility include condensed azo, insoluble azo, quinacridone, isoindoline, anthraquinone, imidazolone, cobalt, phthalocyanine, carbon, titanium oxide, iron oxide, and pearl pigments, such as mica, and the like, for example. The pattern printed layer 3 can be formed by performing gravure printing, offset printing, screen printing, flexo printing, electrostatic printing, ink jet printing, and the like to the transparent resin layer 4 using the materials mentioned above. Moreover, besides a method including applying an ink containing a mixture of the binder and the pigment mentioned above to form the pattern printed layer 3, a pattern can be formed by vapor deposition or sputtering of various metals.

[Transparent Resin Layer 4]

For the transparent resin layer 4, a transparent resin sheet 4 obtained by molding a resin composition which contains the crystalline polypropylene resin as the main component (90 to 100% by weight) and to which various additives, such as existing heat stabilizers, flame retardants, UV absorbers, light stabilizers, antiblocking agents, catalyst scavengers, colorants, light scattering agents, and gloss regulators, are added as necessary into a sheet shape is usable. In particular, in the decorative sheet 1a of this embodiment, the transparent resin sheet 4 in which the peak intensity ratio x calculated based on Expression (2) above from the infrared absorption spectrum measured by the Fourier infrared spectrometry is set to x≤0.65 by controlling molding processing conditions is preferably used. In this case, the thickness of the transparent resin sheet 4 is set to 20 μm to 200 μm, for example. Specific examples of the molding processing conditions include temperature conditions, such as the melting temperature of the resin composition and the extrusion temperature and the roll temperature relating to the film formation, and conveyance conditions, such as the sheet winding speed, and the like. In this embodiment, controlling the temperature conditions and the conveyance conditions adjust the cooling rate in the film formation to thereby adjust the degree of crystallization of the transparent resin sheet 4 to be obtained. Accordingly, the peak intensity ratio x is set to x≤0.65 and preferably 0.55≤x≤0.65.

Furthermore, the nucleating agent vesicle is added to the resin composition configuring the transparent resin sheet 4. Thus, the degree of crystallization of the resin composition can be easily increased, and thus the transparent resin sheet 4 extremely excellent in transparency can be obtained.

As the heat stabilizers, a phenol type, a sulfur type, a phosphorus type, a hydrazine type, and the like are usable, for example. As the flame retardants, aluminum hydroxide, magnesium hydroxide, and the like are usable, for example. As the UV absorbers, a benzotriazole type, a benzoate type, a benzophenone type, a triazine type, and the like are usable, for example. As the light stabilizers, a hindered amine type and the like are usable, for example.

[Topcoat Layer 5]

Materials of the topcoat layer 5 can be selected as appropriate from a polyurethane type, an acrylic type, an acryl silicon type, a fluorine type, an epoxy type, a vinyl type, a polyester type, a melamine type, an aminoalkyd type, a urea type, and the like, for example, to be used. The form of the materials is also not particularly limited and may be an aqueous, an emulsion, a solvent type, and the like. A curing method can also be selected as appropriate from a one-part type which is cured alone, a two-part type using a curing agent together with a main agent, a type which is cured by irradiation with ultraviolet rays, electron beams, and the like to be used. In particular, one which is cured by mixing an isocyanate-based curing agent with a urethane-based main agent is suitable from the viewpoint of workability, cost, and aggregation force of a resin itself.

[Film Formation Method for the Transparent Resin Sheet 4]

Herein, a detailed film formation flow of the transparent resin sheet 4 is described. First, pellets of the resin composition in which the existing various additives are added as described above to the crystalline polypropylene resin as the main component are charged into a melting extruder. Thereafter, the pellets are kneaded under heating to be melted into a liquid, and then the liquid resin composition is extruded with a predetermined width from a T die provided in an extrusion orifice towards a cooling roll provided on the downstream side. In this case, it is configured so that the liquid resin composition extruded from the T die advances crystallization until reaching the cooling roll, and then the crystallization is completed by contacting the cooling roll. The cooling roll is rotating at a predetermined rotation speed around the central axis of the roll. The resin composition contacting the cooling roll is formed into the transparent resin sheet 4 having a sheet shape, conveyed at a predetermined conveyance speed to the downstream side, and finally wound by a winding roll. In this embodiment, in order to set the peak intensity ratio x of the transparent resin sheet 4 to be obtained within a predetermined range, the temperature of the resin composition extruded from the melting extruder, the temperature of the cooling roll, and the sheet conveyance speed as the film formation conditions are adjusted.

[Method for Producing Decorative Sheet 1a]

The decorative sheet 1a of this embodiment is formed by successively laminating the pattern printed layer 3, the concealing layer 2, and the primer layer 6 using the above-described materials by the above-described method on one surface of the transparent resin sheet 4 formed by the film formation flow. When an emboss pattern 4a is provided on the transparent resin layer 4, the transparent resin sheet 4 is pressed using a die roll for embossing to give the emboss pattern 4a to the other surface of the transparent resin sheet 4. Furthermore, the topcoat layer 5 is formed on the surface of the emboss pattern 4a to obtain the decorative sheet 1a.

In the decorative sheet 1a of this embodiment, it is desirable that the primer layer 6 is set to 0.1 μm to 3.0 μm, the concealing layer 2 is set to 2 μm to 10 μm, the pattern printed layer 3 is set to 3 μm to 20 μm, the transparent resin sheet 4 as the transparent resin layer 4 is set to 20 μm to 200 μm, and the topcoat layer 5 is set to 3 μm to 20 μm and it is suitable that the total thickness of the decorative sheet 1a is set within the range of 30 μm to 250 μm.

Second Embodiment

<Entire Configuration>

Figure 2:
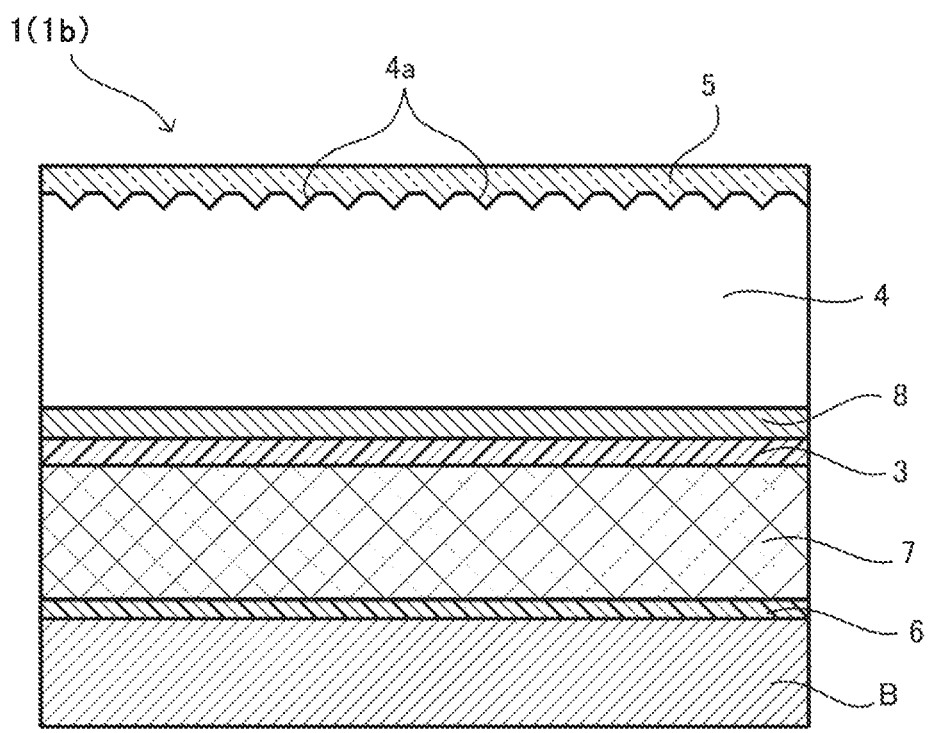
FIG. 2 is a schematic cross sectional view illustrating the configuration of a decorative sheet according to a second embodiment of the present invention.

FIG. 2 illustrates the structure of a decorative sheet 1(1b) of the second embodiment of the present invention. The configuration of the decorative sheet 1b is formed by successively laminating the primer layer 6, the primary film layer 7, the pattern printed layer 3, an adhesive layer 8, the transparent resin layer 4, and the topcoat layer 5 from the substrate B side to which the decorative sheet 1b is stuck. Examples of the substrate B include wooden boards, inorganic boards, metal plates, and the like, for example.

For the primer layer 6, the pattern printed layer 3, the transparent resin layer 4, and the topcoat layer 5, those having the same configurations as those of the first embodiment are usable. Therefore, descriptions of the layers described above are omitted herein.

[Primary Film Layer 7]

The primary film layer 7 is a sheet-shaped member. The primary film layer 7 can be arbitrarily selected from paper, such as thin paper, titanium paper, and resin impregnated paper, synthetic resin, such as polyethylene, polypropylene, polybutylene, polystyrene, polycarbonate, polyester, polyamide, an ethylene-vinyl acetate polymer, polyvinyl alcohol, and acrylic resin or a foam of the synthetic resin mentioned above, rubber, such as ethylene-propylene polymer rubber, ethylene-propylene-diene copolymer rubber, styrene-butadiene copolymer rubber, styrene-isoprene-styrene block copolymer rubber, and polyurethane, organic or inorganic non-woven fabrics, synthetic paper, metallic foil, such as aluminum, iron, gold, and silver, and the like, for example, to be used. When the primary film resin sheet 7 containing a polyolefin-based resin as the main component is used as the primary film layer 7, the surface is inactive. Therefore, it is preferable to perform surface activation treatment to both surfaces of the primary film resin sheet 7 by corona treatment, plasma treatment, ozonization treatment, electron beam treatment, UV treatment, dichromic acid treatment, and the like. Furthermore, also between the primary film resin sheet 7 and the pattern printed layer 3, the primer layer 6 may be provided in order to secure sufficient adhesiveness. When concealing properties are to be given to the decorative sheet 1b, concealing properties may be given by providing the concealing layer 2 or adding an opaque pigment or the like to the primary film resin sheet 7 itself.

[Adhesive Layer 8]

The adhesive layer 8 can be selected from an acrylic type, a polyester type, a polyurethane type, and the like, for example, to be used. In general, a two-part type material containing a urethane-based polyol as the main agent and isocyanate as a curing agent is used from workability, cost, and high aggregation force.

[Method for Producing Decorative Sheet 1b]

In the decorative sheet 1b of this embodiment, first, corona treatment is performed to both surfaces of a primary film resin sheet 7 as the primary film layer 7, and then the primer layer 6 is formed on one surface of the primary film resin sheet 7 and the pattern printed layer 3 is formed on the other surface. Then, the transparent resin sheet 4 as the transparent resin layer 4 formed by the above-described film formation flow and the surface on the side of the pattern printed layer 3 of the primary film resin sheet 7 on which the pattern printed layer 3 and the primer layer 6 are formed are bonded to each other with the adhesive layer 8 interposed between the layers using methods employing hot pressing, e.g., an extrusion lamination method, a dry lamination method, and the like, to be laminated. Thus, a laminated film is formed. In this case, when the emboss pattern 4a is provided on the surface of the transparent resin layer 4, the emboss pattern 4a is formed on the laminated film by a method employing hot pressing or a method employing a cooling roll on which irregularities are formed. Finally, the topcoat layer 5 is provided on the surface of the transparent resin layer 4 of the laminated film to obtain the decorative sheet 1b.

In the decorative sheet 1b of this embodiment, it is desirable that the primary film layer 7 is set to 100 µm to 250 µm considering printing workability, cost, and the like, the adhesive layer 8 is set to 1 µm to 20 µm, the transparent resin layer 4 is set to 20 µm to 200 µm, and the topcoat layer 5 is set to 3 µm to 20 µm and it is suitable that the total thickness of the decorative sheet 1b is set within the range of 130 µm to 500 µm.

Advantageous Effects of Each Embodiment (1) In the decorative sheet 1 of each embodiment of the present invention, with respect to the transparent resin sheet 4 as the transparent resin layer 4, the crystalline polypropylene resin is contained as the main component and the value of the peak intensity ratio x calculated based on Expression (2) above from the absorption spectrum obtained by the Fourier infrared spectrometry is set within the range of x≤0.65 and more preferably 0.55≤x≤0.65.

According to this configuration, the decorative sheet 1 including the transparent resin layer 4 having excellent post-processing resistance as compared with former decorative sheets can be provided.

(2) Moreover, in the decorative sheet 1 of each embodiment of the present invention, the nano-sized nucleating agent, more specifically the nucleating agent vesicle in which the nucleating agent is encapsulated in a vesicle having a monolayer outer membrane, is added to the resin composition configuring the transparent resin sheet 4.

According to this configuration, high dispersibility of the nucleating agent is realized in the resin composition and the degree of crystallization of the resin composition can be increased by the nucleating agent. Therefore, the decorative sheet 1 including the transparent resin sheet 4 having extremely high transparency as compared with former decorative sheets can be provided.

EXAMPLES

Hereinafter, specific Examples of the decorative sheets 1 according to the embodiments of the present invention are described.

Examples 1 to 4, Comparative Examples 1 to 4

In Examples 1 to 4 and Comparative Examples 1 to 4, a resin composition in which 500 PPM of a hindered phenolic antioxidant (Irganox 1010, manufactured by BASF A.G.), 2000 PPM of a benzotriazole-based UV absorber (Tinuvin 328, manufactured by BASF A.G.), 2000 PPM of a hindered amine-based light stabilizer (Chimassorb 944, manufactured by BASF A.G.), and 1000 PPM of a phosphoric acid ester metal salt-based nucleating agent (Adekastab NA-21, manufactured by ADEKA CORPORATION) were added to a high crystalline homopolypropylene resin was subjected to the above-described film formation flow using a melting extruder. Thus, the transparent resin sheets 4 having a thickness of 100 µm to be used as the transparent resin layer 4 were individually formed.

The peak intensity ratios x of the transparent resin sheets 4 measured for the transparent resin sheets 4 of Examples 1 to 4 and Comparative Examples 1 to 4 obtained as described are shown in Table 1. In Examples 1 to 4 and Comparative Examples 1 to 4, the peak intensity ratios x were adjusted by controlling the extrusion temperature, the roll temperature, and the sheet conveyance speed in the film formation.

Examples 5 and 6

In Examples 5 and 6, a resin composition in which 500 PPM of a hindered phenolic antioxidant (Irganox 1010, manufactured by BASF A.G.), 2000 PPM of a benzotriazole-based UV absorber (Tinuvin 328, manufactured by BASF A.G.), 2000 PPM of a hindered amine-based light stabilizer (Chimassorb 944, manufactured by BASF A.G.), and 1000 PPM of a nucleating agent vesicle were added to a high crystalline homopolypropylene resin was subjected to the above-described film formation flow using a melting extruder. Thus, the transparent resin sheets 4 having a thickness of 100 μm used as the transparent resin layer 4 were individually formed.

The peak intensity ratios x of the transparent resin sheets 4 measured for the transparent resin sheets 4 of Examples 5 and 6 obtained as described are shown in Table 1. In Examples 5 and 6, the peak intensity ratios x were adjusted by controlling the extrusion temperature, the roll temperature, and the sheet conveyance speed in the film formation.

As the added nucleating agent vesicle, a nucleating agent vesicle in which a phosphoric acid ester metal salt-based nucleating agent was encapsulated in a vesicle having a monolayer outer membrane was obtained by placing 100 parts by mass of methanol, 82 parts by mass of a phosphoric acid ester metal salt-based nucleating agent (Adekastab NA-21, manufactured by ADEKA CORPORATION), and 5 parts by mass of phosphatidylcholine in a high-pressure stainless steel container kept at 60° C., followed by sealing, injecting carbon dioxide so that the pressure was 20 MPa to achieve a supercritical state, injecting 100 parts by mass of ion exchanged water while vigorously stirring and mixing the resultant substance, performing stirring for 15 minutes in a state where the temperature and the pressure in the container were held, and then discharging the carbon dioxide to return the pressure to the atmospheric pressure. The particle diameter of the obtained nucleating agent vesicle had a size of 0.05 μm to 0.8 μm.

Subsequently, corona treatment was performed to both surfaces of the transparent resin sheets 4 of Examples 1 to 6 and Comparative Examples 1 to 4 obtained by the above-described method to set the surface wetting tension to 40 dyn/cm or more. Moreover, pattern printing was performed to one surface of the transparent resin sheet 4 with a two-part curable urethane ink (V180, manufactured by TOYO INK MFG. CO., LTD.) to form the pattern printed layer 3 and a two-part curable urethane ink (V180, manufactured by TOYO INK MFG. CO., LTD.) having concealing properties was applied in an overlapping manner to the pattern printed layer 3 with an application amount of 6 g/m² to form the concealing layer 2. Moreover, a two-part curable urethane ink (PET-E, Reducer, manufactured by Dainichiseika Color & Chemicals Mfg. Co., Ltd.) was applied in an overlapping manner to the concealing layer 2 with an application amount of 1 g/m² to form the primer layer 6. Thereafter, pressing was performed to the other surface of the transparent resin sheet 4 using a die roll for embossing to give the emboss pattern 4a. Then, a two-part curable urethane topcoat (W184, manufactured by DIC Graphics Corporation) was applied to the surface of the emboss pattern 4a formed as described above with an application amount of 3 g/m² to obtain the decorative sheet 1 having a total thickness of 110 μm illustrated in FIG. 1.

<Evaluation>

The decorative sheets 1 of Examples 1 to 6 and Comparative Examples 1 to 4 obtained by the above-described method were evaluated for post-processing resistance by performing a V groove bending processing suitability test and a haze value measurement test.

Hereinafter, a detailed method of each test is described.

<V Groove Bending Processing Suitability Test>

First, each of the decorative sheets 1 of Examples 1 to 6 and Comparative Examples 1 to 4 obtained by the above-described method is stuck to one surface of a medium-density fiberboard (MDF) as the substrate B using an urethane-based adhesive, and then a V-shaped groove is cut in the other surface of the substrate B to the boundary where the substrate B and the decorative sheet 1 are stuck to each other so as not to damage the decorative sheet 1 on the opposite side. Next, the substrate B is bent to 90° along the V-shaped groove so that the surface of the decorative sheet 1 is bent in a mountain fold shape, and then it is observed using an optical microscope whether whitening or cracking occurs in a bent portion of the surface of the decorative sheet 1 to evaluate superiority or inferiority of the post-processing resistance. The evaluation was performed in the following two stages.

○: No Whitening or cracking or the like was observed.

x: Whitening or cracking which cannot be accepted as a decorative sheet was observed.

<Haze Value Measurement Test>

Herein, the haze value is a value that expressed a value obtained by, when light entering from one surface of an object is emitted to the other surface, dividing a value (diffuse transmittance), which is obtained by subtracting an integrated value (straight line transmittance) of only a straight line component among light beams emitted from the other surface from an integrated value (total light transmittance) of all light beams emitted from the other surface, with the total light transmittance by percentage. A smaller value indicates that the transparency is higher. The haze value is determined by an internal haze determined by the internal state of the object, such as the degree of crystallization and the spherocrystal size in a crystal portion, and an external haze determined by the surface state of the object, such as the presence of irregularities of the incident surface and the emission surface. In this test, when simply referred to as the haze value, the haze value means a value determined by the internal haze and the external haze.

This test was performed for each transparent resin sheet 4 using a haze value measurement tester (manufactured by Nippon Denshoku Industries Co., LTD.; NDH2000). Blank measurement is performed beforehand in a state where nothing is attached to a sample holder. In the measurement of each transparent resin sheet 4, a sample was attached to the sample holder, a sample transmission measurement was performed under the same conditions as those of the blank measurement, and then a value expressing the ratio of the sample transmission measurement to the blank measurement by percentage was calculated as the haze value. Then, in this test, the transparent resin sheet 4 having a haze value of less than 15% was judged to be accepted.

The results of the V groove bending processing suitability test and the haze value measurement test are shown in Table 1.

TABLE 1

| | Peak intensity ratio | V groove bending processing | Haze value (%) | Judgement |
|---|---|---|---|---|
| Comp. Ex. 1 | <0.53 | Film cannot be formed. | | X |
| Comp. Ex. 2 | 0.53 | ○ | 15 | ○ |
| Ex. 1 | 0.55 | ○ | 12 | ⊚ |
| Ex. 2 | 0.60 | ○ | 10 | ⊚ |
| Ex. 3 | 0.63 | ○ | 10 | ⊚ |
| Ex. 4 | 0.65 | ○ | 8 | ⊚ |
| Ex. 5 | 0.60 | ○ | 8 | ⊚ |
| Ex. 6 | 0.58 | ○ | 9 | ⊚ |
| Comp. Ex. 3 | 0.68 | X | 8 | X |
| Comp. Ex. 4 | 0.70 | X | 8 | X |

The results of each test of the decorative sheet 1 clarified as shown in Table 1 that, in the decorative sheets 1 of Examples 1 to 6 in which the peak intensity ratio x of the transparent resin sheet 4 is 0.55≤x≤0.65 and the decorative sheet 1 of Comparative Example 2 in which the peak intensity ratio x is x=0.53, no whitening or cracking or the like is not observed in the V groove bending processing suitability test, and thus the decorative sheets 1 have excellent post-processing resistance. Comparative Example 1 in which the peak intensity ratio x is x<0.53 was not able to form a film. In the decorative sheets 1 of Comparative Examples 3 and 4 in which the peak intensity ratio x is x>0.65, whitening or cracking which cannot be accepted as a decorative sheet was observed.

Moreover, the haze values of Examples 1 to 6 and Comparative Examples 2 to 4 were all 15% or less, and thus have transparency suitable for the decorative sheet 1. In particular, in the decorative sheets 1 of Examples 5 and 6 in which the nucleating agent vesicle was added, the haze values are small values as compared with the decorative sheets 1 of Comparative Examples 1 and 2 set to the similar peak intensity ratio x, and thus it is found that the decorative sheets 1 of Examples 5 and 6 have more excellent transparency. This is considered that the dispersibility of the nucleating agent added to the resin composition is improved, and therefore scattering of light decreases and the transparency is improved.

From the results above, it was clarified that, by setting the peak intensity ratio x of the transparent resin sheet 4 as the transparent resin layer 4 to x≤0.65 and preferably 0.55≤x≤0.65, the decorative sheet 1 excellent in post-processing resistance and transparency can be obtained.

In the column of "Judgment" of Table 1, the decorative sheet particularly excellent in post-processing resistance and transparency is marked with "⊚", the decorative sheet excellent in post-processing resistance and transparency is marked with "○", and the decorative sheet poor in post-processing resistance and transparency is marked with "x".

Moreover, it was clarified that, by adding the nucleating agent vesicle to the transparent resin sheet 4 to increase the dispersibility of the nucleating agent in the transparent resin sheet 4, the decorative sheet 1 having extremely high transparency and excellent design properties can be obtained.

The decorative sheet 1 of the present invention is not limited to the above-described embodiments and Examples and can be variously altered insofar as the features of the invention are not impaired.

Reference Example

Hereinafter, a decorative sheet other than the decorative sheets described in the present embodiments is briefly described as a reference example of the present invention.

In recent years, as illustrated in PTLs 1 to 5, a large number of decorative sheets containing an olefin-based resin have been proposed as a decorative sheet substituting a polyvinyl chloride decorative sheet.

These decorative sheets do not contain a vinyl chloride resin, and therefore can prevent the generation of poisonous gas or the like in incineration. However, the decorative sheets described in PTLs 1 to 5 contain a common polypropylene sheet or soft polypropylene sheet, and therefore the surface scratch resistance has been poor and the scratch resistance has been much inferior to the scratch resistance of former polyvinyl chloride decorative sheets.

Then, the present inventors have proposed a decorative sheet excellent in surface scratch resistance and post processability described in PTL 6 in order to overcome these defects. However, the use of a decorative board using such a decorative sheet has increasingly expanded and the consciousness of consumers to the quality has also increasingly increased.

In general, the crystalline resin, such as polypropylene resin, can change mechanical properties by controlling the degree of crystallization which is a ratio of a crystalline component to an amorphous component in the resin. Factors for controlling the degree of crystallization include material factors, such as the molecular structure of the resin itself, addition of a nucleating agent, and the like, and process factors, such as molding processing conditions in processing the crystalline resin. The present inventors have conducted extensive studies focusing on the process factors to complete a decorative sheet including a resin sheet in which the range of the degree of crystallization in which the post-processing resistance is excellent is specified by controlling the process factors.

Moreover, the spherocrystal size in a crystal portion of the polypropylene resin is usually larger than the wavelength (400 to 750 nm) of visible light, and therefore scattering of light increases and milk white color is exhibited. However, it has been required for the transparent resin layer in which the substitution to a polypropylene resin has been expected that the pattern, design, or the like formed in a layer lower than the transparent resin layer is clearly viewed through the transparent resin layer and it has been demanded for the transparent resin layer to have high transparency from the viewpoint of design properties. REFERENCE SIGNS LIST 1 decorative sheet
1a decorative sheet
1b decorative sheet
2 concealing layer
3 pattern printed layer
4 transparent resin layer (transparent resin sheet)
4a emboss pattern
5 topcoat layer
6 primer layer
7 primary film layer (primary film resin sheet)
8 adhesive layer

The invention claimed is:
1. A decorative sheet comprising:
a transparent resin layer containing a crystalline polypropylene resin as a main component,
wherein
a value of a peak intensity ratio x represented by a following expression (1) of the transparent resin layer is 0.55≤x≤0.65,
I997, I938, and I973 in the following expression (1) are peak intensity values calculated from an absorption spectrum obtained by Fourier infrared spectrometry of the transparent resin layer, I997 represents a peak intensity value at a wavenumber of 997 $cm^{-1}$, I938 represents a peak intensity value at a wavenumber of 938 $cm^{-1}$, and I973 represents a peak intensity value at a wavenumber of 973 $cm^{-1}$,

[Expression 1]

$$\text{Peak intensity ratio } x = \frac{I997 - I938}{I973 - I938} \quad (1)$$

wherein the transparent resin layer has a thickness of 20 µm or more and 200 µm or less and contains a nano-sized nucleating agent, wherein the nano-sized nucleating agent is contained in the transparent resin layer in a state where the nucleating agent is encapsulated in a vesicle having a mono-layer outer membrane, and wherein a concealing layer containing aluminum of a flake shape is provided on a back side of the transparent resin layer.

* * * * *